(12) United States Patent
Kim et al.

(10) Patent No.: US 11,914,823 B2
(45) Date of Patent: Feb. 27, 2024

(54) DISPLAY DEVICE AND METHOD OF DRIVING THE SAME

(71) Applicant: SAMSUNG DISPLAY CO., LTD., Yongin-si (KR)

(72) Inventors: Dong Hyun Kim, Yongin-si (KR); Sung Hoon Kim, Yongin-si (KR); Ok Kyung Park, Yongin-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 0 days.

(21) Appl. No.: 17/690,218

(22) Filed: Mar. 9, 2022

(65) Prior Publication Data
US 2022/0391039 A1      Dec. 8, 2022

(30) Foreign Application Priority Data

Jun. 8, 2021   (KR) .......................... 10-2021-0074336

(51) Int. Cl.
*G06F 3/04842* (2022.01)
*G06F 3/044* (2006.01)
*G09G 3/32* (2016.01)
*G06F 3/041* (2006.01)
*G06F 3/04886* (2022.01)

(52) U.S. Cl.
CPC ........ *G06F 3/0443* (2019.05); *G06F 3/04166* (2019.05); *G06F 3/04842* (2013.01); *G06F 3/04886* (2013.01); *G09G 3/32* (2013.01); *G09G 2300/0842* (2013.01); *G09G 2310/027* (2013.01); *G09G 2340/0464* (2013.01)

(58) Field of Classification Search
CPC ....... G06F 3/0416–04166; G06F 3/044; G06F 3/0443; G06F 3/0445; G06F 3/0446; G06F 3/0448; G06F 3/047; G06F 3/048; G06F 3/04812; G06F 3/04817; G06F 3/0484–04855; G06F 3/0487; G06F 3/04886; G06F 3/04895; G06F 3/04897; G06F 2203/04102; G06F 2203/04803; G06F 2203/04805; G06F 2203/04806; G09G 3/32–3291; G09G 2300/0842; G09G 2310/027; G09G 2340/0464
See application file for complete search history.

(56) References Cited

U.S. PATENT DOCUMENTS

| 10,296,053 B1 * | 5/2019 | Quinn ................. G06F 3/03547 |
| 2009/0063967 A1 | 3/2009 | Lee et al. |
| 2012/0029661 A1 * | 2/2012 | Jones .................... G06F 3/0484 700/17 |

(Continued)

FOREIGN PATENT DOCUMENTS

KR   101430519 B1   8/2014

*Primary Examiner* — Nathan Danielsen
(74) *Attorney, Agent, or Firm* — CANTOR COLBURN LLP

(57) ABSTRACT

The disclosure relates to a display device and a method of driving the same. The display device includes: a display panel which displays an image in a plurality of pixel areas; a timing controller which supplies a control signal for controlling a display position, a display shape, a display size and the number of at least one touch bar; and a data driver which supplies a data signal to display the at least one touch bar at the display position in response to the control signal.

10 Claims, 9 Drawing Sheets

(56) References Cited

U.S. PATENT DOCUMENTS

| | | | | |
|---|---|---|---|---|
| 2014/0075388 A1* | 3/2014 | Kuscher | .............. | G06F 3/04883 |
| | | | | 715/834 |
| 2018/0196595 A1* | 7/2018 | Adderly | .................. | G06F 3/017 |
| 2021/0027722 A1* | 1/2021 | Rao | ....................... | G06F 3/0412 |
| 2021/0089150 A1* | 3/2021 | Wang | ...................... | G06F 3/041 |
| 2021/0405828 A1* | 12/2021 | Jiang | ................... | G06F 3/04886 |

\* cited by examiner

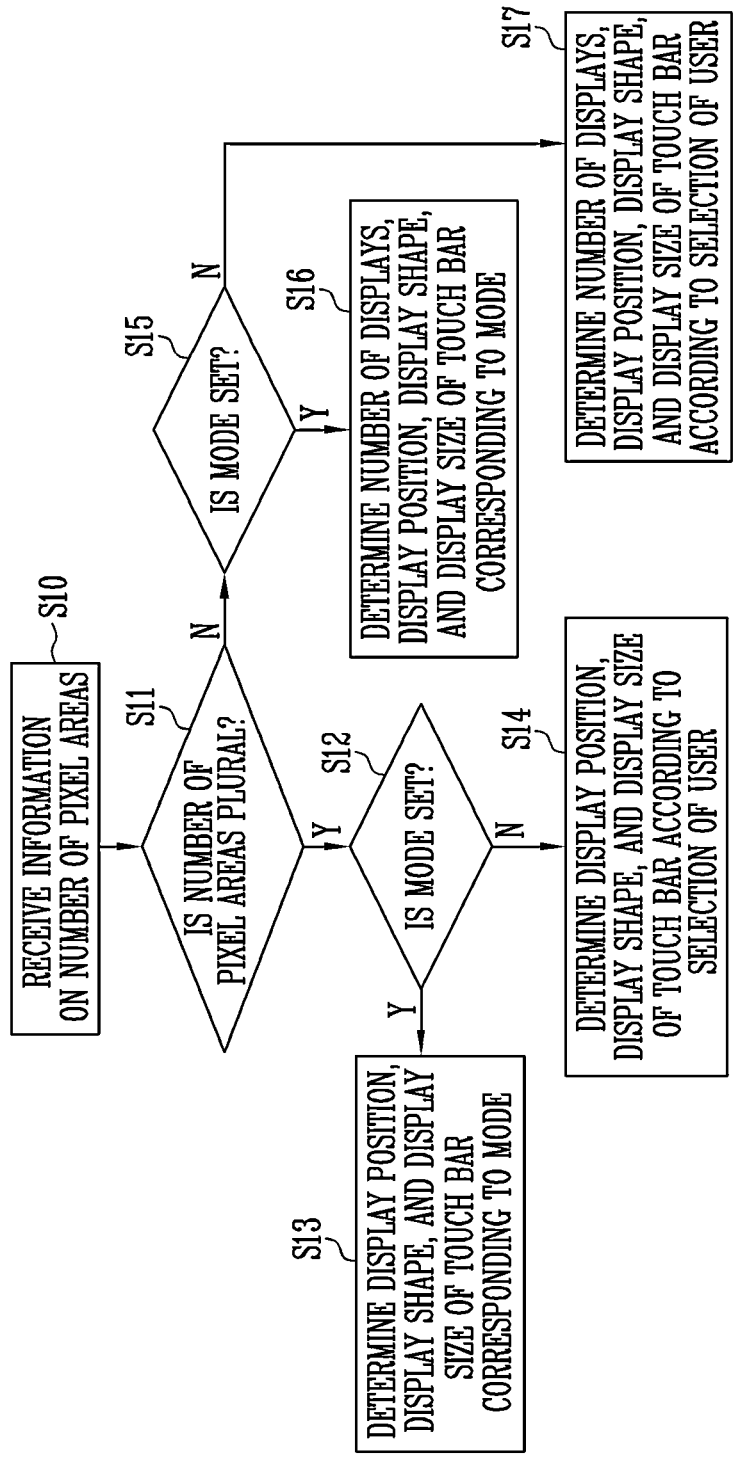

DISPLAY DEVICE AND METHOD OF DRIVING THE SAME

This application claims priority to Korean Patent Application No. 10-2021-0074336, filed on Jun. 8, 2021, and all the benefits accruing therefrom under 35 U.S.C. § 119, the content of which in its entirety is herein incorporated by reference.

BACKGROUND

1. Field

The disclosure relates to a display device and a method of driving the same.

2. Description of the Related Art

As an information technology is developed, importance of a display device that is a connection medium between a user and information is emphasized. In response to this, a use of a display device such as a liquid crystal display device and an organic light emitting display device is increasing.

The display device may not include a separate mechanical button by including a touch sensor as an input means, and thus a wide display screen may be secured. In addition, various functions may be performed by implementing a touch button on an additional touch bar.

As the number of screens displayed on the display device increases, a touch bar that performs various functions according to convenience of a user is desirable for each screen.

SUMMARY

A technical aspect to be solved by the disclosure is to implement a touch bar disposed on a display panel in various shapes in a foldable and touchable display device.

In addition, a technical aspect to be solved by the disclosure is to implement a touch bar in various shapes on each of a plurality of display panels in a foldable and touchable display device.

In addition, the technical aspects to be achieved by the embodiment are not limited to the technical aspects described above, and other technical aspects that are not described may be clearly understood by those of ordinary skill in the art from the description of the embodiment.

According to an embodiment of the disclosure, a display device includes: a display panel which displays an image in a plurality of pixel areas; a timing controller which supplies a first control signal for controlling a display position, a display shape, a display size and the number of at least one touch bar; and a data driver which supplies a data signal to display the at least one touch bar at the display position in response to the control signal.

In an embodiment, the timing controller may further include: a mode selector which selects the display position, the display shape, and the display size according to a mode; and a touch bar controller which supplies a second control signal for displaying the same number of touch bars of the at least one touch bar as the number of the pixel areas, in response to the mode.

In an embodiment, the display panel may include: a first pixel area which displays a first partial image and a first touch bar of the at least one touch bar; and a second pixel area which displays a second partial image and a second touch bar of the at least one touch bar.

In an embodiment, the first touch bar may be displayed in a first display shape and a first display size at a first display position, and the second touch bar may be displayed in a second display shape and a second display size at a second display position.

In an embodiment, the display panel may further include a third pixel area which displays a third partial image and a third touch bar of the at least one touch bar, and the third touch bar may be displayed in a third display shape and a third display size at a third display position.

In an embodiment, the display panel may include: a first pixel area which displays a first partial image; and a second pixel area including an input interface. The at least one touch bar may be displayed on one side surface of the input interface.

In an embodiment, the display panel may include: a first pixel area which displays a first partial image and a first touch bar of the at least one touch bar; and a second pixel area including an input interface. The first touch bar may be displayed under the first partial image, and a second touch bar of the at least one touch bar may be displayed under the input interface.

In an embodiment, the display panel may include: a first pixel area which displays a first partial image and a first touch bar of the at least one touch bar, where the first touch bar is displayed under the first partial image; and a second pixel area which displays an input interface and a second touch bar of the at least one touch bar, where the second touch bar has a display shape and a display size different from the display shape and the display size of the first touch bar and is displayed on one side surface of the input interface.

According to an embodiment of the disclosure, a method of driving a display device includes: displaying an image in a plurality of pixel areas; supplying a first control signal for controlling a display position, a display shape, a display size, and the number of at least one touch bar; and supplying a data signal to display the at least one touch bar at the display position in response to the control signal.

In an embodiment, supplying the first control signal may include: selecting the display position, the display shape, and the display size according to a mode; and supplying a second control signal for displaying the same number of touch bars of the at least one touch bar as the number of the pixel areas in response to the mode.

In an embodiment, displaying the image in the plurality of pixel areas may include: displaying a first partial image and a first touch bar of the at least one touch bar in a first pixel area; and displaying a second partial image and a second touch bar of the at least one touch bar in a second pixel area.

In an embodiment, the first touch bar may be displayed in a first display shape and a first display size at a first display position, and the second touch bar may be displayed in a second display shape and a second display size at a second display position.

The display device and the method of driving the same according to the disclosure may implement a touch bar in various shapes according to selection of a user in a foldable and touchable display panel.

In addition, the display device and the method of driving the same according to the disclosure may a touch bar in various shapes according to selection of a user in a plurality of foldable and touchable display panels.

BRIEF DESCRIPTION OF THE DRAWINGS

The above and other features of the disclosure will become more apparent by describing in further detail embodiments thereof with reference to the accompanying drawings, in which:

FIG. 10 is a flowchart illustrating a method of driving a display device according to an embodiment of the disclosure.

DETAILED DESCRIPTION

Figure 1:
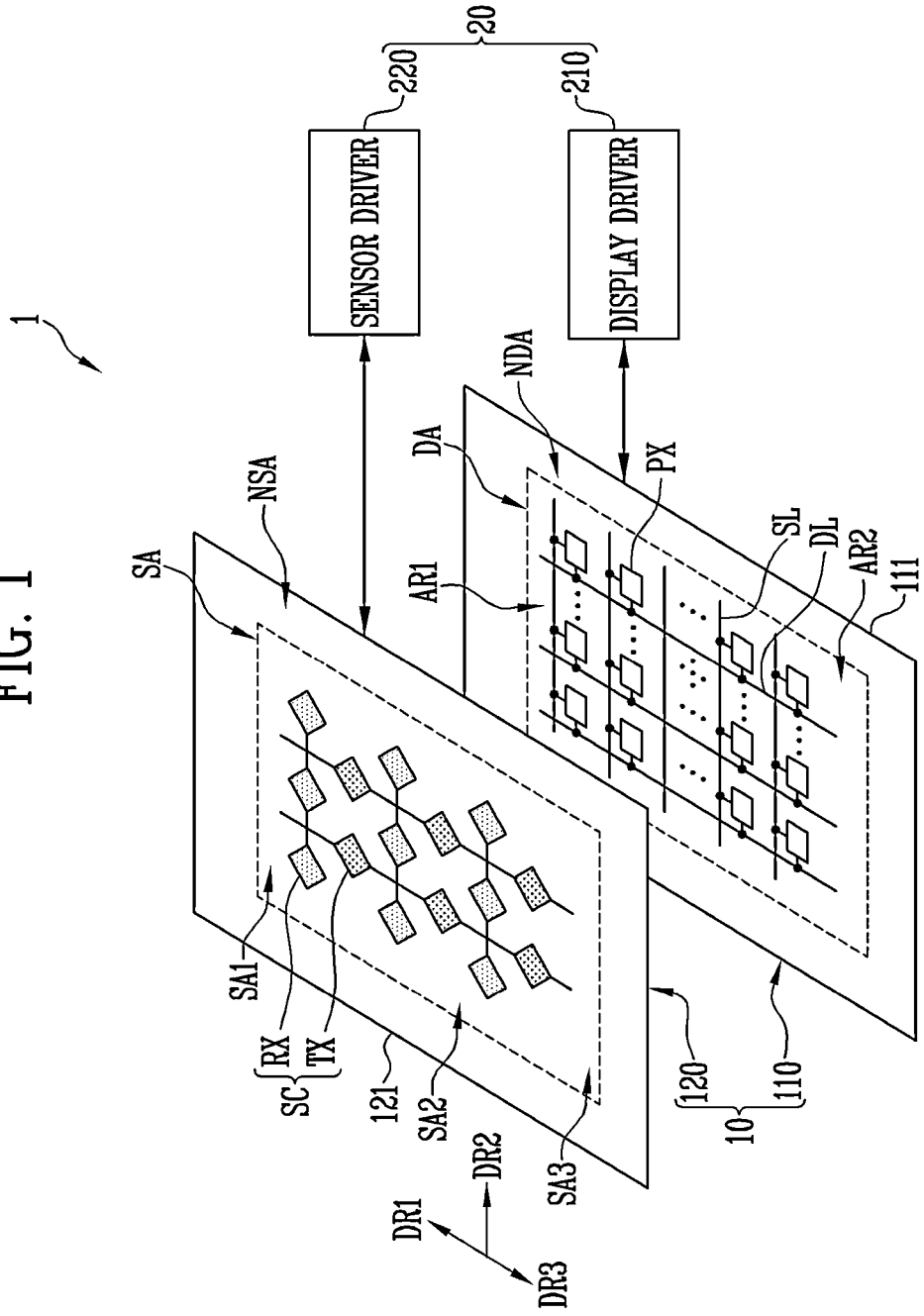
FIG. 1 is a diagram illustrating a display device according to an embodiment of the disclosure.

Hereinafter, preferable embodiments are described in detail with reference to the accompanying drawings. Advantages and features of the embodiments, and a method of achieving them will be apparent with reference to the embodiments described later in detail together with the accompanying drawings. However, the disclosure is not limited to the embodiments disclosed below, but may be implemented in a variety of different forms, only the present embodiments are intended to complete the disclosure of the disclosure and are provided to completely inform the scope of the disclosure to those of ordinary skill in the art to which the embodiment belongs, and embodiments are only defined by the scope of the claims. The same reference numerals refer to the same elements throughout the specification.

Unless otherwise defined, all terms (including technical and scientific terms) used in the present specification may be used with meanings that may be commonly understood by those of ordinary skill in the art to which the embodiment belongs. In addition, terms defined generally used dictionaries are not interpreted ideally or excessively unless explicitly defined specifically. The terms used in the present specification are for describing the embodiments and are not intended to limit the embodiments. In the present specification, the singular form also includes the plural form unless specifically stated in the phrase.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

The terminology used herein is for the purpose of describing particular embodiments only and is not intended to be limiting. As used herein, the singular forms "a," "an," and "the" are intended to include the plural forms, including "at least one," unless the content clearly indicates otherwise. "At least one" is not to be construed as limiting "a" or "an." "Or" means "and/or." As used herein, the term "and/or" includes any and all combinations of one or more of the associated listed items. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

FIG. 1 is a diagram illustrating a display device according to an embodiment of the disclosure.

Referring to FIG. 1, the display device 1 according to an embodiment of the disclosure may include a display panel 10 and a driving circuit unit 20 for driving the display panel 10.

The display panel 10 may include a display unit 110 for displaying an image and a sensor unit 120 for sensing touch, pressure, fingerprint, hovering, and the like. The display panel 10 may include pixels PX and sensors SC positioned to overlap at least some of the pixels PX in a plan view which is a view from a top of a major surface of the sensor unit 120. The sensors SC may include first sensors TX and second sensors RX. Alternatively, the sensors SC may be configured of one type of sensors without distinction between the first sensors TX and the second sensors RX.

The driving circuit unit 20 may include a display driver 210 for driving the display unit 110 and a sensor driver 220 for driving the sensor unit 120. For example, the display driver 210 may drive the display unit 110 so that the pixels PX display an image in units of a display frame period. The sensor driver 220 may drive the sensor unit 120 so that the sensors SC sense an input of a user in units of a sensing frame period synchronized with the display frame period.

According to an embodiment, the display unit 110 and the sensor unit 120 may be separately manufactured, and then disposed and/or combined so that at least one region overlaps each other in the plan view. Alternatively, the display unit 110 and the sensor unit 120 may be integrally manufactured.

In FIG. 1, the sensor unit 120 is disposed on a front side (for example, an upper surface on which the image is displayed) of the display unit 110, but a position of the sensor unit 120 according to the invention is not limited thereto. The sensor unit 120 may be disposed on a back surface or both surfaces of the display unit 110 in another embodiment. The sensor unit 120 may be disposed on at least one edge region of the display unit 110.

The display unit 110 may include a display substrate 111 and a plurality of pixels PX disposed on the display substrate 111. The pixels PX may be disposed in a display area DA of the display substrate 111.

The display substrate 111 may include the display area DA in which the image is displayed and a non-display area NDA outside the display area DA. For example, the display area DA may be disposed in a central area of the display unit 110, and the non-display area NDA may be disposed at an edge area of the display unit 110 to surround the display area DA.

The display substrate 111 may be a rigid substrate or a flexible substrate, and a material or a physical property thereof is not particularly limited. For example, the display substrate 111 may be a rigid substrate formed of or including glass or tempered glass, or a flexible substrate formed of or including a thin film of a plastic or metal material.

In the display area DA, scan lines SL, data lines DL, and the pixels PX connected to the scan lines SL and the data lines DL are disposed. The pixels PX are selected by a scan signal of a turn-on level supplied from the scan lines SL, receive a data signal from the data lines DL, and emit light of a luminance corresponding to the data signal. That is, an image corresponding to the data signal is displayed in the display area DA.

In the disclosure, a structure, a driving method, and the like of the pixels PX are not particularly limited. For example, each of the pixels PX may be implemented as a pixel of various currently known structures and/or driving methods.

Various lines and/or built-in circuits connected to the pixels PX of the display area DA may be disposed in the non-display area NDA. For example, a plurality of lines for supplying various power and control signals to the display area DA may be disposed in the non-display area NDA, and a scan driver or the like may be further disposed in the non-display area NDA.

In the disclosure, a type of the display unit 110 is not particularly limited. For example, the display unit 110 may be implemented as a self-emission type display panel such as an organic light emitting display panel. However, when the display unit 110 is implemented as a self-emission type, each pixel according to the invention is not limited to a case in which only an organic light emitting element is included. For example, a light emitting element of each pixel may be configured of an organic light emitting diode, an inorganic light emitting diode, a quantum dot/well light emitting diode, and the like. A plurality of light emitting elements may be provided in each pixel. At this time, the plurality of light emitting elements may be connected in series, parallel, series/parallel, or the like. Alternatively, the display unit 110 may be implemented as a non-emission type display panel such as a liquid crystal display panel. When the display unit 110 is implemented as a non-emission type, the display device 1 may additionally include a light source such as a backlight unit.

The display unit 110 may include a first pixel area AR1 and a second pixel area AR2. The first pixel area AR1 may be positioned in a first direction DR1 from the second pixel area AR2. The second pixel area AR2 may be positioned in a third direction DR3 from the first pixel area AR1. When the display unit 110 is in a planar state, the first direction DR1 may be a direction opposite to the third direction DR3.

In FIG. 1, the display unit 110 includes only the first pixel area AR1 and the second pixel area AR2, but the disclosure is not limited thereto. For example, the display unit 110 may include N pixel areas (where N is a natural number). Specifically, the first pixel area AR1 shown in FIG. 1 may be divided into K pixel areas (where K is a natural number). In addition, the second pixel area AR2 may be divided into N-K pixel areas.

The sensor unit 120 includes a sensor substrate 121 and a plurality of sensors SC disposed on the sensor substrate 121. The sensors SC may be disposed in a sensing area SA on the sensor substrate 121. For example, the sensing area SA may be set to an area corresponding to the display area DA (for example, an area overlapping the display area DA), and a peripheral area NSA may be set as an area corresponding to the non-display area NDA (for example, an area overlapping the non-display area NDA in the plan view). In this case, when a touch input or the like is provided on the display area DA, the touch input may be detected through the sensor unit 120.

The sensor substrate 121 may be a rigid or flexible substrate. In addition, the sensor substrate 121 may be configured of at least one insulating layer. In addition, the sensor substrate 121 may be a transparent or translucent light-transmitting substrate, but the sensor substrate 121 according to the invention is not limited thereto. That is, in the disclosure, a material and a physical property of the sensor substrate 121 are not particularly limited. For example, the sensor substrate 121 may be a rigid substrate formed of or including glass or tempered glass, or a flexible substrate formed of or including a thin film of a plastic or metal material.

The sensing area SA is set as an area capable of responding to the touch input (that is, an active area of a sensor). To this end, the sensors SC for sensing the touch input or the like may be disposed in the sensing area SA. According to an embodiment, the sensors SC may include the first sensors TX and the second sensors RX.

In an embodiment, for example, each of the first sensors TX may extend in the first direction DR1. The first sensors TX may be arranged in a second direction DR2. The second direction DR2 may be different from the first direction DR1. For example, the second direction DR2 may be a direction orthogonal to the first direction DR1. In another embodiment, an extension direction and an arrangement direction of the first sensors TX may follow other conventional configurations. Each of the first sensors TX may have a shape in which first cells having a relatively large area and first bridges having a relatively small area are connected.

In FIG. 1, each of the first cells has a diamond shape, but each of the first cells may be configured in various conventional shapes such as a circle shape, a quadrangle shape, a triangle shape, and a mesh shape (mesh form) in another embodiment. For example, the first bridges may be integrally formed in the same layer as the first cells. In another embodiment, the first bridges may be disposed in a layer different from that of the first cells, and may electrically connect adjacent first cells.

Each of the second sensors RX may extend in the second direction DR2. The second sensors RX may be arranged in the first direction DR1. In another embodiment, an extension direction and an arrangement direction of the second sensors RX may follow other conventional configurations. Each of the second sensors RX may have a shape in which second cells having a relatively large area and second bridges having a relatively small area are connected.

In FIG. 1, each of the second cells has a diamond shape, but each of the second cells may be configured in various conventional shapes such as a circle shape, a quadrangle shape, a triangle shape, and a mesh shape in another embodiment. For example, the second bridges may be integrally formed in the same layer as the second cells. In another embodiment, the second bridges may be disposed in a layer different from the layer of the second cells and may electrically connect the second cells.

According to an embodiment, each of the first sensors TX and the second sensors RX may have conductivity by including at least one of a metallic material, a transparent conductive material, and various other conductive materials. For example, the first sensors TX and the second sensors RX may include at least one of various metal materials including gold (Au), silver (Ag), aluminum (Al), molybdenum (Mo), chromium (Cr), titanium (Ti), nickel (Ni), neodymium (Nd), copper (Cu), platinum (Pt), or an alloy thereof. At this time, the first sensors TX and the second sensors RX may be configured in a mesh shape.

In addition, the first sensors TX and the second sensors RX may include at least one of various transparent conductive materials including silver nanowire (AgNW), indium tin oxide ("ITO"), indium zinc oxide ("IZO"), indium gallium zinc oxide ("IGZO"), antimony zinc oxide ("AZO"), indium tin zinc oxide ("ITZO"), zinc oxide (ZnO), tin oxide (SnO2), carbon nano tube, grapheme, and the like.

In addition, the first sensors TX and the second sensors RX may have conductivity by including at least one of various conductive materials. In addition, each of the first sensors TX and the second sensors RX may be formed of a single layer or multiple layers, and a cross-sectional structure thereof is not particularly limited.

In the peripheral area NSA of the sensor unit 120, sensor lines for electrically connecting the sensors TX and RX to the sensor driver 220 and the like may be intensively disposed.

The sensing area SA of the sensor unit 120 may include a first sensing area SA1 that at least partially overlaps the first pixel area AR1 and a second sensing area SA2 that at least partially overlaps the second pixel area AR2 in the plan view. The first sensing area SA1 may be positioned in the first direction DR1 from the second sensing area SA2. The second sensing area SA2 may be positioned in the third direction DR3 from the first sensing area SA1. When the sensor unit 120 is in a planar state, the first direction DR1 may be a direction opposite to the third direction DR3. The sensor unit 120 may receive a first touch input from the user.

In FIG. 1, the sensor unit 120 includes only the first sensing area SA1 and the second sensing area SA2, but the sensor unit 120 according to the invention is not limited thereto. For example, the sensor unit 120 may include N sensing areas. Specifically, the first sensing area SA1 shown in FIG. 1 may be divided into K sensing areas. In addition, the second sensing area SA2 may be divided into N-K sensing areas. At this time, each of the N sensing areas may overlap each of the N pixel areas in the plan view.

The driving circuit unit 20 may include a display driver 210 for driving the display unit 110 and a sensor driver 220 for driving the sensor unit 120. In an embodiment, the display driver 210 and the sensor driver 220 may be configured of separate integrated chips ("ICs"). In another embodiment, at least a portion of the display driver 210 and the sensor driver 220 may be integrated in one IC together.

Figure 2:
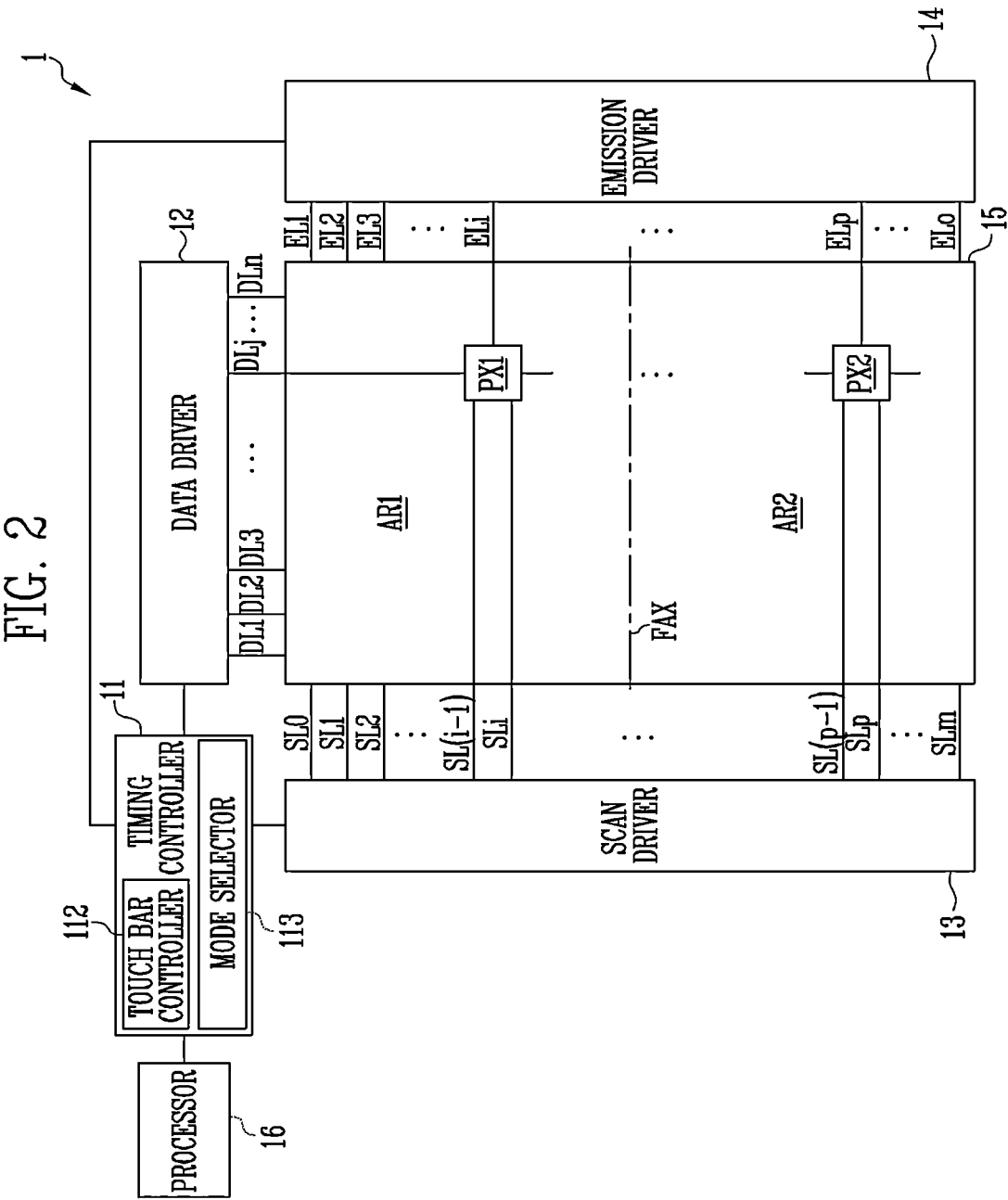
FIG. 2 is a diagram illustrating an example of a pixel unit and a display driver of the display device of FIG. 1.

The display driver 210 is electrically connected to the display unit 110 to drive the pixels PX. For example, as shown in FIG. 2, the display driver 210 may include a data driver 12 and a timing controller 11, and a scan driver 13 may be separated mounted in the non-display area NDA of the display unit 110. Alternatively, the display driver 210 may include all or at least some of the data driver 12, the timing controller 11, and the scan driver 13.

The display driver 210 may provide a first image including a first partial image corresponding to the first pixel area AR1 and a second partial image corresponding to the second pixel area AR2, to the display unit 110.

The sensor driver 220 is electrically connected to the sensor unit 120 to drive the sensor unit 120. The sensor driver 220 may include a sensor transmitter and a sensor receiver. According to an embodiment, the sensor transmitter and the sensor receiver may be integrated in one IC, but the disclosure is not limited thereto.

FIG. 2 is a diagram illustrating an example of a pixel unit and a display driver of the display device of FIG. 1.

Referring to FIG. 2, the display device 1 according to an embodiment includes the timing controller 11, the data driver 12, the scan driver 13, an emission driver 14, a pixel unit 15, and a processor 16.

The timing controller 11 may include a touch bar controller 112 and a mode selector 113.

The timing controller 11 may receive grayscale values and control signals for each image frame from the processor 16. The timing controller 11 may provide control signals suitable for respective specifications to the data driver 12, the scan driver 13, the emission driver 14, and the like to display an image corresponding to an image frame.

The timing controller 11 may render the grayscale values to correspond to a specification of the pixel unit 15. For example, an external processor may provide a red grayscale value, a green grayscale value, and a blue grayscale value for each unit dot. However, for example, when the pixel unit 15 is a PENTILE™ structure, since adjacent unit dots share the pixel, the pixel may not correspond to each grayscale value one-to-one. In this case, rendering of the grayscale values is desirable. When the pixel corresponds to each grayscale value one-to-one, rendering of the grayscale values may be unnecessary.

The grayscale values that are rendered or not rendered may be provided to the data driver 12. The data driver 12 may generate data voltages to be provided to data lines DL1, DL2, DL3, DLj and DLn by using the grayscale values and the control signals.

The timing controller 11 may supply controls signals for selecting a display position, a display shape, a display size, and the number of at least one touch bar TB1a, TB1b, TB1c, TB1d, TB2, TB3 (refer to FIGS. 4 to 9).

The mode selector 113 may select the display position, the display shape, the display size and the number of the at least one touch bar according to a mode in response to the control signal input from the processor 16. For example, the display position, the display shape, the display size and the number of the at least one touch bar in a first mode may be different from the display position, the number of displays, the display shape, and the display size of the touch bar in a second mode. According to an embodiment, when the number of pixel areas and the number of touch bars are different from each other, the mode selector 113 may select the display position, the display shape, the display size and the number of the at least one touch bar according to a mode. According to another embodiment, when the number of pixel areas and the number of touch bars are the same, the mode selector 113 may select the display position, the display shape, and the display size according to the mode except for the number of the at least one touch bar.

The touch bar controller 112 may supply a control signal for controlling the touch bar according to the mode selected by the mode selector 113. The touch bar controller 112 may supply a control signal for controlling the touch bar in response to a setting of the user.

The data driver 12 may sample the grayscale values using a clock signal, and apply data voltages corresponding to the grayscale values to the data lines DL1 to DLn in a pixel row (for example, pixels connected to the same scan lines) unit. Here, j and n may be integers greater than 0.

The data driver 12 may apply a data voltage corresponding to data including the display position, the display shape, the display size and the number of the at least one touch bar to the data lines DL1 to DLn in a pixel row unit by using the control signal.

The scan driver 13 may receive a clock signal, a scan start signal, and the like from the timing controller 11 and generate scan signals to be provided to scan lines SL0, SL1, SL2, SL(i−1), SLi, SL(p−1), SLp, and SLm. Here, i, p, and m may be integers greater than 0, p may be an integer greater than i, and m may be an integer greater than i.

The scan driver 13 may sequentially supply scan signals having a pulse of a turn-on level to the scan lines SL0 to SLm. The scan driver 13 may include scan stages configured in a form of a shift register. The scan driver 13 may generate the scan signals in a method of sequentially transferring a scan start signal that is a pulse form of a turn-on level to a next scan stage according to control of the clock signal.

First scan lines SL0 to SLi may be connected to first pixels PX1 of the first pixel area AR1. Second scan lines SL(p−1) to SLm may be connected to second pixels PX2 of the second pixel area AR2.

The emission driver 14 may receive a clock signal, an emission stop signal, and the like from the timing controller 11 and generate emission signals to be provided to the emission lines EL1, EL2, EL3 ... ELp ... ELo. Here, o may be an integer greater than 0. For example, the emission driver 14 may sequentially provide light emission signals having a pulse of a turn-off level to the emission lines EL1 to ELo. For example, each emission stage of the emission driver 14 may be configured in a form of a shift register, and may generate the emission signals in a method of sequentially transferring the emission stop signal that is a pulse form of a turn-off level to a next emission stage according to control of the clock signal. In another embodiment, the emission driver 14 may be omitted according to a circuit configuration of the pixels PX1 and PX2.

The pixel unit 15 may include the first pixel area AR1 and the second pixel area AR2. The first pixel area AR1 may include the first pixels PX1 connected to the data lines DL1 to DLn and the first scan lines SL0 to SLi. The second pixel area AR2 may be in contact with the first pixel area AR1 at a folding axis FAX and may include the second pixels PX2 connected to the data lines DL1 to DLn and the second scan lines SL(p−1) to SLm.

Each of the pixels PX1 and PX2 may be connected to a corresponding data line, scan line, and emission line. In another embodiment, when the emission driver 14 is omitted, the pixels PX1 and PX2 may not be connected to the emission lines EL1 to ELo.

The folding axis FAX may be positioned between the first pixel area AR1 and the second pixel area AR2. The display device 1 may be folded with respect to the folding axis FAX. In such a configuration, the folding axis FAX may be fixed. At this time, the pixel areas AR1 and AR2 may be fixed areas. Alternatively, the folding axis FAX may be variable. At this time, the pixel areas AR1 and AR2 may be variable areas.

In FIG. 2, the first pixel PX1 and the second pixel PX2 are connected to the same data line DLj for position comparison. However, the first pixel PX1 and the second pixel PX2 may be connected to different data lines in another embodiment.

The processor 16 may correspond to at least one of a graphics processing unit ("GPU"), a central processing unit ("CPU"), an application processor ("AP"), and the like. The processor 16 may receive an input from the user and supply a control signal including information on the number of pixel areas to the timing controller 11. The processor 16 may receive the input from the user and supply a control signal including information on the display position, the display shape, the display size and the number of the at least one touch bar to the timing controller 11.

Figure 3:
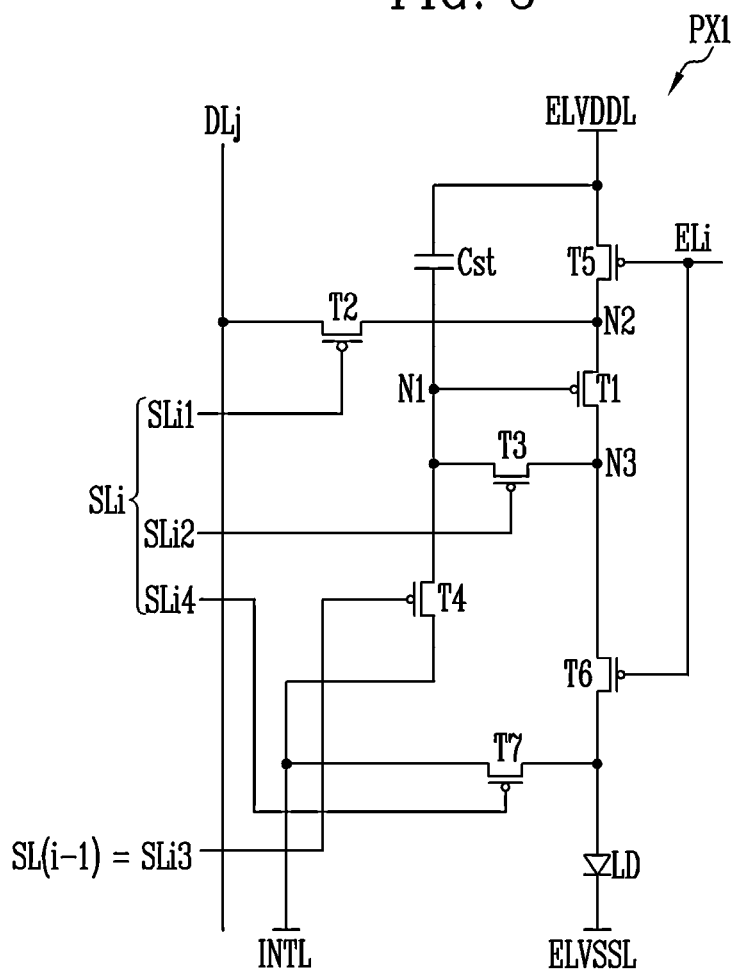
FIG. 3 is a diagram illustrating an example of a pixel included in the display device of FIG. 1.

FIG. 3 is a diagram illustrating an example of the pixel included in the display device of FIG. 1.

The first pixels PX1 are described as an example with reference to FIG. 3. However, since the second pixels PX2 are the same as the first pixels PX1, a repetitive description is omitted.

Referring to FIG. 3, the first pixels PX1 include transistors T1, T2, T3, T4, T5, T6, and T7, a storage capacitor Cst, and a light emitting element LD.

Hereinafter, a circuit configured of a P-type transistor is described as an example. However, those skilled in the art will be able to design a circuit configured of an N-type transistor by changing a polarity of a voltage applied to a gate terminal. Similarly, those skilled in the art will be able to design a circuit configured of a combination of a P-type transistor and an N-type transistor. The P-type transistor collectively refers to a transistor in which a current amount increases when a voltage difference between a gate electrode and a source electrode increases in a negative direction. The N-type transistor collectively refers to a transistor in which a current amount increases when a voltage difference between a gate electrode and a source electrode increases in a positive direction. The transistor may be configured in various forms such as a thin film transistor ("TFT"), a field effect transistor ("FET"), a bipolar junction transistor ("BJT"), and the like.

The first transistor T1 may have a gate electrode connected to a first node N1, a first electrode connected to a second node N2, and a second electrode connected to a third node N3. The first transistor T1 may be referred to as a driving transistor.

The second transistor T2 may have a gate electrode connected to a scan line SLi1, a first electrode connected to the data line DLj, and a second electrode connected to the second node N2. The second transistor T2 may be referred to as a scan transistor.

The third transistor T3 may have a gate electrode connected to a scan line SLi2, a first electrode connected to the first node N1, and a second electrode connected to the third node N3. The third transistor T3 may be referred to as a diode connection transistor.

The fourth transistor T4 may have a gate electrode connected to a scan line SLi3, a first electrode connected to the first node N1, and a second electrode connected to an initialization line INTL. The fourth transistor T4 may be referred to as a gate initialization transistor.

The fifth transistor T5 may have a gate electrode connected to an i-th emission line ELi, a first electrode connected to a first power line ELVDDL, and a second electrode connected to the second node N2. The fifth transistor T5 may be referred to as an emission transistor. In another embodiment, the gate electrode of the fifth transistor T5 may be connected to another emission line.

The sixth transistor T6 may have a gate electrode connected to the i-th emission line ELi, a first electrode connected to the third node N3, and a second electrode connected to an anode of the light emitting element LD. The sixth transistor T6 may be referred to as an emission transistor. In another embodiment, the gate electrode of the sixth transistor T6 may be connected to an emission line different from the emission line connected to the gate electrode of the fifth transistor T5.

The seventh transistor T7 may have a gate electrode connected to a scan line SLi4, a first electrode connected to the initialization line INTL, and a second electrode connected to the anode of the light emitting element LD. The seventh transistor T7 may be referred to as a light emitting element initialization transistor.

A first electrode of the storage capacitor Cst may be connected to the first power line ELVDDL, and a second electrode of the storage capacitor Cst may be connected to the first node N1.

The light emitting element LD may have the anode connected to the second electrode of the sixth transistor T6 and a cathode connected to a second power line ELVSSL. The light emitting element LD may be a light emitting diode. The light emitting element LD may be configured of an organic light emitting diode, an inorganic light emitting diode, a quantum dot/well light emitting diode, or the like. The light emitting element LD may emit light in any one of a first color, a second color, and a third color. In addition, in the present embodiment, only one light emitting element LD is provided in each pixel, but a plurality of light emitting elements may be provided in each pixel in another embodiment. At this time, the plurality of light emitting elements may be connected in series, parallel, series/parallel, or the like.

A first power voltage may be applied to the first power line ELVDDL, a second power voltage may be applied to the second power line ELVSSL, and an initialization voltage may be applied to the initialization line INTL. For example, the first power voltage may be greater than the second power voltage. For example, the initialization voltage may be equal to or greater than the second power voltage.

Figure 4:
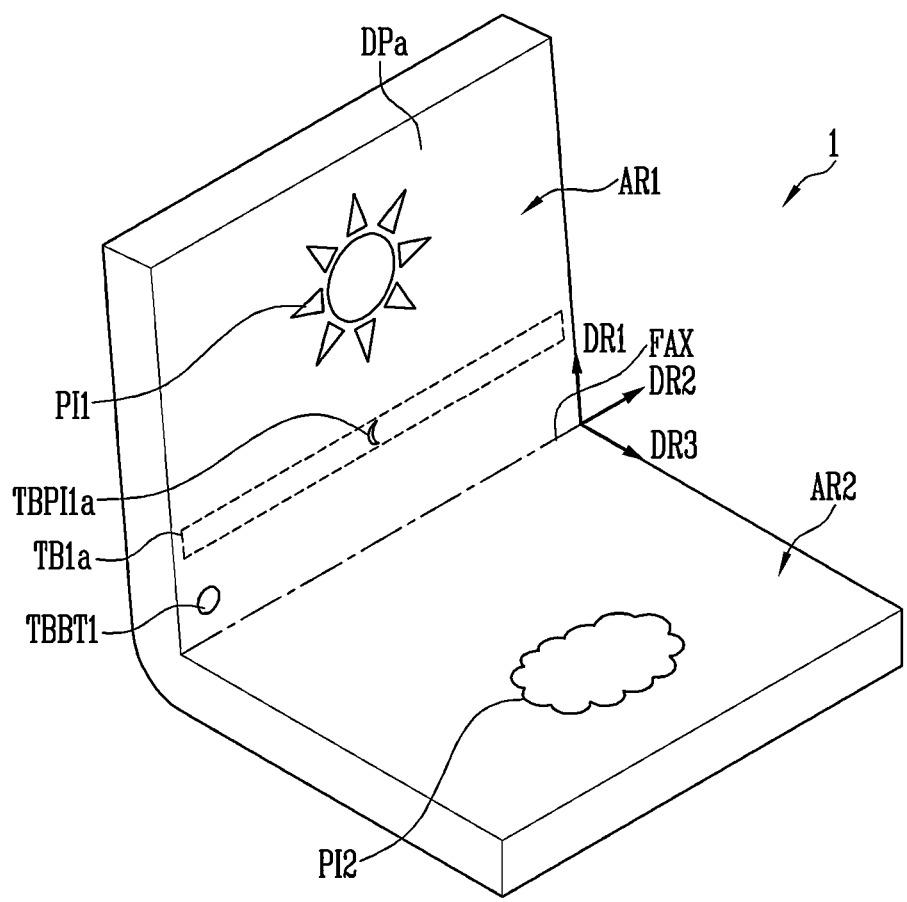
FIG. 4 is a diagram illustrating an example of a pixel area and a touch bar included in the display device of FIG. 1.

FIG. 4 is a diagram illustrating an example of the pixel area and the touch bar included in the display device of FIG. 1.

Referring to FIG. 4, the display device 1 is folded at a predetermined angle, and a display surface DPa is in a state that is not completely closed.

Referring to FIG. 4, the display unit 110 of the display device 1 may include the first pixel area AR1 and the second pixel area AR2 that is in contact with the first pixel area AR1 at the folding axis FAX.

The first pixel area AR1 may be positioned in the first direction DR1 from the second pixel area AR2. The first pixel area AR1 may be positioned on a plane defined in the first direction DR1 and the second direction DR2.

A first partial image PI1, a first touch bar TB1a, and a first touch button TBBT1 may be displayed in the first pixel area AR1. A first touch bar partial icon TBPI1a may be included in the first touch bar TB1a and displayed in the first pixel area AR1.

The first partial image PI1, the first touch bar TB1a, the first touch bar partial icon TBPI1a, and the first touch button TBBT1 included in the first pixel area AR1 may be displayed on the plane defined in the first direction DR1 and the second direction DR2. At this time, the first direction DR1 and the second direction DR2 may be orthogonal to each other.

The first touch bar TB1a may be displayed under the first partial image PI1 (a first display area). The first touch bar partial icon TBPI1a may be included in the first touch bar TB1a and may be displayed under the first partial image PI1 (that is, in a direction opposite to the first direction DR1). According to an embodiment, the first touch bar TB1a may have a rectangular shape.

The first touch bar partial icon TBPI1a is for controlling the first partial image PI1 and has various functions. For example, the first touch bar partial icon TBPI1a may execute or end the display of the first partial image PI1. In addition, although not shown in FIG. 4, the first touch bar TB1a may include a plurality of first touch bar partial icons TBPI1a for performing various functions.

The first touch button TBBT1 may be disposed (i.e., displayed) on one lower side surface of the first touch bar TB1a. The first touch button TBBT1 may control the first touch bar TB1a and the first touch bar partial icon TBPI1a.

According to an embodiment, when the first touch button TBBT1 is touched by the user, a mode selection window (not shown) for selecting a mode that is stored in advance may be displayed in the first pixel area AR1. In addition, different first touch bars TB1a stored in advance in response to the mode selected by the user may be displayed. In addition, the first touch bar TB1a may include a first touch bar partial icon TBPI1a for performing a function stored in advance.

The first touch bar TB1a including the first touch bar partial icon TBPI1a for performing different functions in response to the selected mode may be displayed in the first pixel area AR1.

According to another embodiment, when the first touch button TBBT1 is touched by the user, a display size area window (not shown) capable of setting a display size of the first touch bar TB1a may be displayed in the first pixel area AR1. In addition, a touch bar function selection window (not shown) for setting the first touch bar partial icon TBPI1a for performing different functions may be displayed.

The first touch bar TB1a including the first touch bar partial icon TBPI1a for performing different functions in response to the setting of the user may be displayed in the first pixel area AR1.

Referring to FIG. 4, the first touch bar TB1a is displayed under the first partial image PI1 (the first display area), but the first touch bar according to the invention is not limited thereto. For example, the first touch bar TB1a may be displayed on one side surface of the first partial image PI1 or may be displayed on the first partial image PI1 in another embodiment.

The second pixel area AR2 may be positioned in the third direction DR3 from the first pixel area AR1. The second pixel area AR2 may be positioned on a plane defined by the second direction DR2 and the third direction DR3. Therefore, a second partial image PI2 may be displayed on the plane defined by the second direction DR2 and the third direction DR3. At this time, the second direction DR2 and the third direction DR3 may be orthogonal to each other.

As described above, the touch bar according to embodiments of the disclosure may be displayed in one area of the first pixel area AR1 by the mode selected by the user or the setting of the user, and may include the touch partial icon that performs various functions according to the mode selected by the user or the setting of the user.

Figure 5:
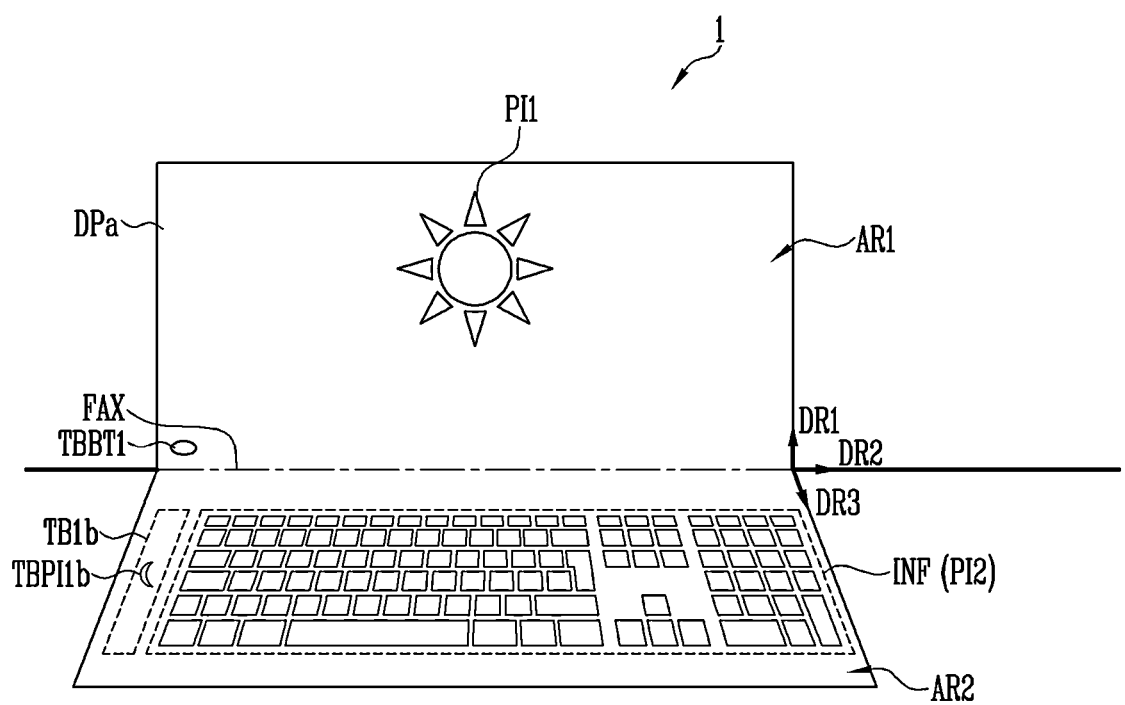
FIG. 5 is a diagram illustrating another example of the pixel area and the touch bar included in the display device of FIG. 1.

FIG. 5 is a diagram illustrating another example of the pixel area and the touch bar included in the display device of FIG. 1. Hereinafter, descriptions of parts substantially overlapping with or identical to those of FIG. 4 are omitted.

Referring to FIG. 5, the display device 1 is in a state that is folded at a predetermined angle, and the display surface DPa is not completely closed. The user may in-fold the display device 1 as shown in FIG. 5 to use the display device 1 as a foldable laptop computer. For example, in a case of FIG. 5, the first pixel area AR1 and the second pixel area AR2 of the display device 1 may be in an in-folded state by about 90 degrees. At this time, the second partial image PI2 may include an input interface INF. The input interface INF may be a keyboard.

Hereinafter, in FIGS. 5, 6, and 7, the second partial image PI2 includes the input interface INF. This is only one possible embodiment and does not limit the scope of the present application. At this time, the input interface INF may be a keyboard.

Referring to FIG. 5, the first partial image PI1 and the first touch button TBBT1 may be displayed in the first pixel area AR1. The input interface INF and the first touch bar TB1$b$ may be displayed in the second pixel area AR2. For example, the first touch bar TB1$b$ may be disposed (i.e., displayed) in a direction opposite to the second direction DR2 from the input interface INF. Although not shown in FIG. 5, the first touch bar TB1$b$ may be disposed in the second direction DR2 from the input interface INF in another embodiment. The first touch bar partial icon TBPI1$b$ may be included in the first touch bar TB1$b$ and may be displayed in the second pixel area AR2.

The first touch button TBBT1 may control the first touch bar TB1$b$ and the first touch bar partial icon TBPI1$a$.

As described above, the touch bar according to embodiments of the disclosure may be displayed on one side surface of the input interface INF included in the second pixel area AR2. Therefore, an area in which the first partial image PI1 included in the first pixel area AR1 is displayed may be widely formed.

Figure 6:
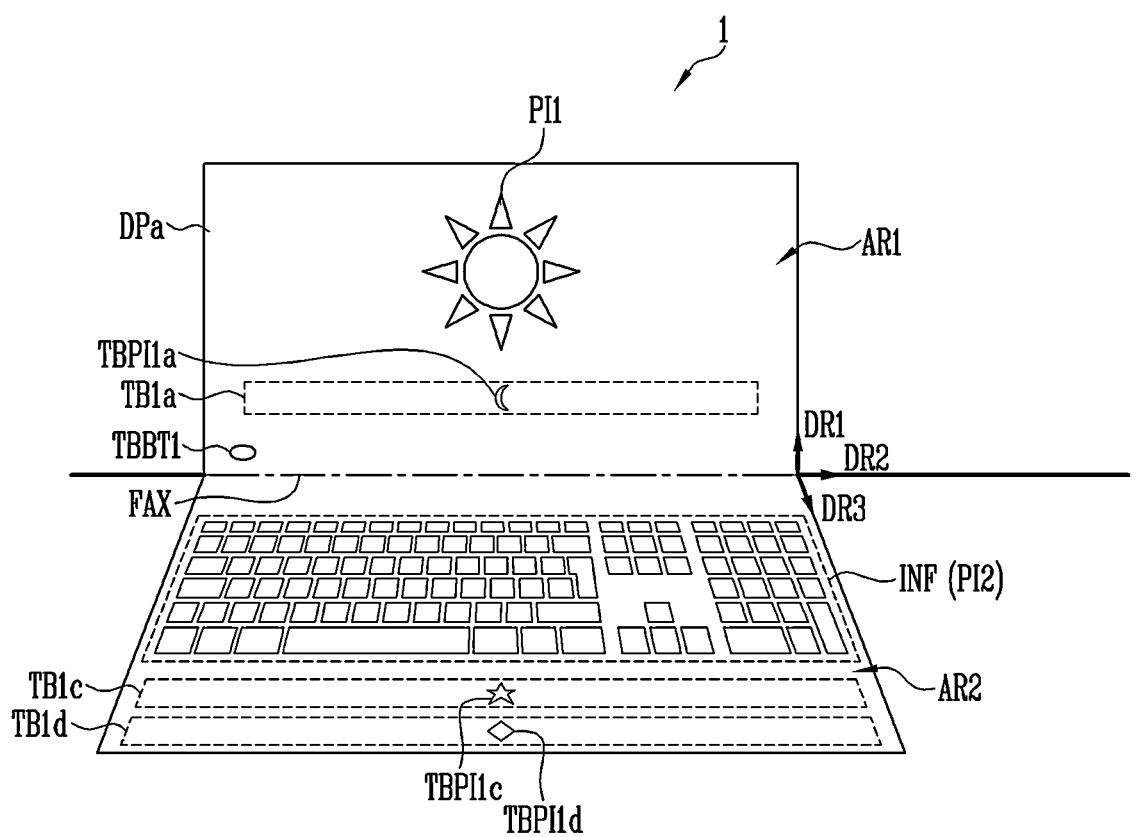
FIG. 6 is a diagram illustrating still another example of the pixel area and the touch bar included in the display device of FIG. 1.

FIG. 6 is a diagram illustrating still another example of the pixel area and the touch bar included in the display device of FIG. 1.

Hereinafter, descriptions of parts substantially overlapping with or identical to those of FIG. 4 are omitted.

Referring to FIG. 6, the input interface INF and a plurality of touch bars TB1$c$ and TB1$d$ may be displayed in the second pixel area AR2. For example, the first touch bar TB1$c$ may be displayed in the third direction DR3 from the input interface INF. The first touch bar TB1$d$ may be disposed (i.e., displayed) in the third direction DR3 from the touch bar TB1$c$. A first touch bar partial icon TBPI1$c$ may be included in the first touch bar TB1$c$ and may be displayed in the second pixel area AR2 defined in the second direction DR2 and the third direction DR3. A first touch bar partial icon TBPI1$d$ may be included in the first touch bar TB1$d$ and may be displayed in the second pixel area AR2.

In FIG. 6, the two touch bars TB1$c$ and TB1$d$ are displayed in the third direction DR3 from the input interface INF, but the disclosure is not limited thereto. For example, N touch bars may be sequentially disposed (i.e., displayed) in the third direction DR3 from the input interface INF in another embodiment.

The first touch bar partial icons TBPI1$a$, TBPI1$c$, and TBPI1$d$ are for controlling the first partial image PI1 and have various functions. According to an embodiment, the first touch bar partial icon TBPI1$a$ may execute or end the first partial image PI1. According to another embodiment, the first touch bar partial icon TBPI1$c$ may convert the first partial image PI1 into another image. According to still another embodiment, the first touch bar partial icon TBPI1$d$ may change a brightness of the first partial image PI1. The function of the first touch bar partial icons TBPI1$a$, TBPI1$c$, and TBPI1$d$ described above is merely an example, and the scope of the disclosure is not limited thereto.

The first touch button TBBT1 may be displayed on one lower side surface of the first touch bar TB1$a$. The first touch button TBBT1 may control the first touch bars TB1$a$, TB1$c$, and TB1$d$ and the first touch bar partial icons TBPI1$a$, TBPI1$c$, and TBPI1$d$.

As described above, the plurality of touch bars according to embodiments of the disclosure may be disposed (i.e., displayed) in one area of the second pixel area AR2 by selection or setting of the user. Therefore, the first partial image PI1 included in the first pixel area AR1 may be further variously controlled.

Figure 7:
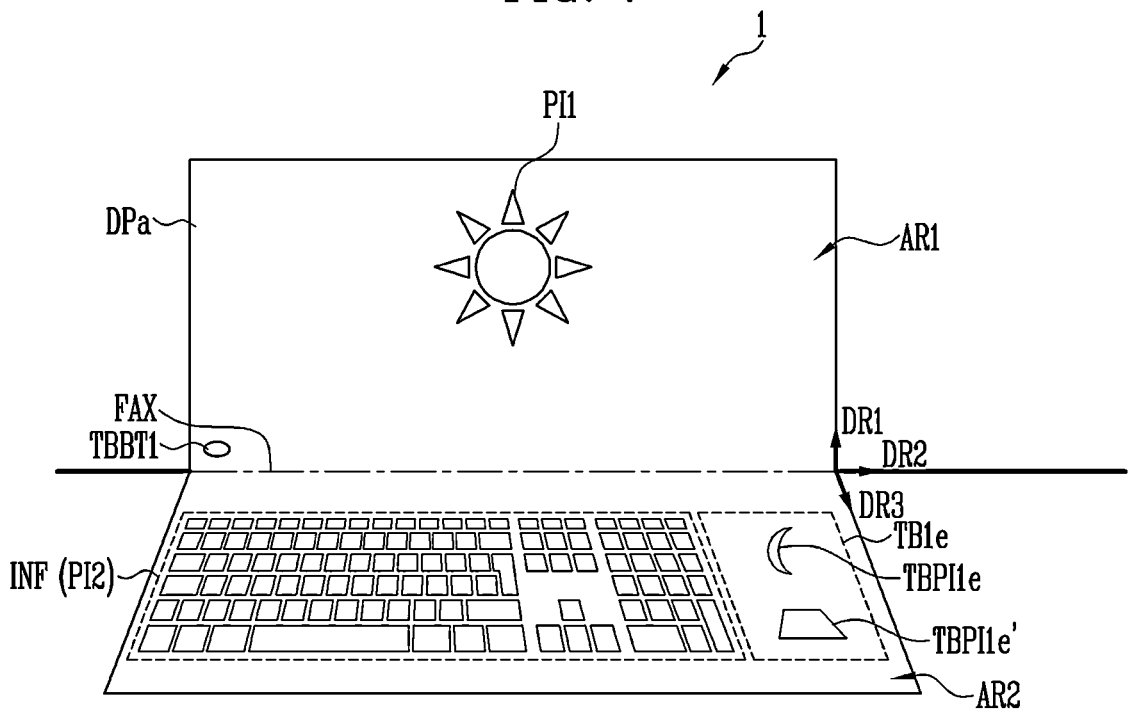
FIG. 7 is a diagram illustrating yet another example of the pixel area and the touch bar included in the display device of FIG. 1.

FIG. 7 is a diagram illustrating yet another example of the pixel area and the touch bar included in the display device of FIG. 1.

Hereinafter, descriptions of parts substantially overlapping with or identical to those of FIG. 4 are omitted.

Referring to FIG. 7, the first partial image PI1 and the first touch button TBBT1 may be displayed in the first pixel area AR1. The first partial image PI1 and the first touch button TBBT1 included in the first pixel area AR1 may be displayed on the plane defined in the first direction DR1 and the second direction DR2.

The input interface INF and a first touch bar TB1$e$ may be displayed in the second pixel area AR2. The input interface INF and the first touch bar TB1$e$ included in the second pixel area AR2 may be positioned on a plane defined in the second direction DR2 and the third direction DR3.

The first touch bar TB1$e$ may be disposed (i.e., displayed) on one side surface positioned in a direction of the second direction DR2 of the input interface INF. Although not shown in FIG. 7, the first touch bar TB1$e$ may be disposed (i.e., displayed) on another side surface positioned in a direction opposite to the second direction DR2 of the input interface INF.

The first touch bar TB1$e$ of FIG. 7 may have a display shape and a display size different from those of the first touch bar TB1$a$ of FIG. 4. For example, the first touch bar TB1$e$ may have a square shape, a long side may be shorter than that of the first touch bar TB1$a$, and a short side may be longer than the first touch bar TB1$b$.

A first touch bar partial icon TBPI1$e$ is for controlling the first partial image PI1 and has various functions. The first touch bar TB1$e$ of FIG. 7 may include a greater number of first touch bar partial icons TBPI1$e$ and TBPI1$e'$ than the first touch bar partial icon TBPI1$a$ included in the first touch bar TB1$a$ of FIG. 4.

As described above, the touch bar according to embodiments of the disclosure may be disposed (i.e., displayed) on one side surface of the input interface INF in various display shapes and display sizes by the selection or the setting of the user, and may include a plurality of touch partial icons that perform various functions by the selection or the setting of the user.

Figure 8:
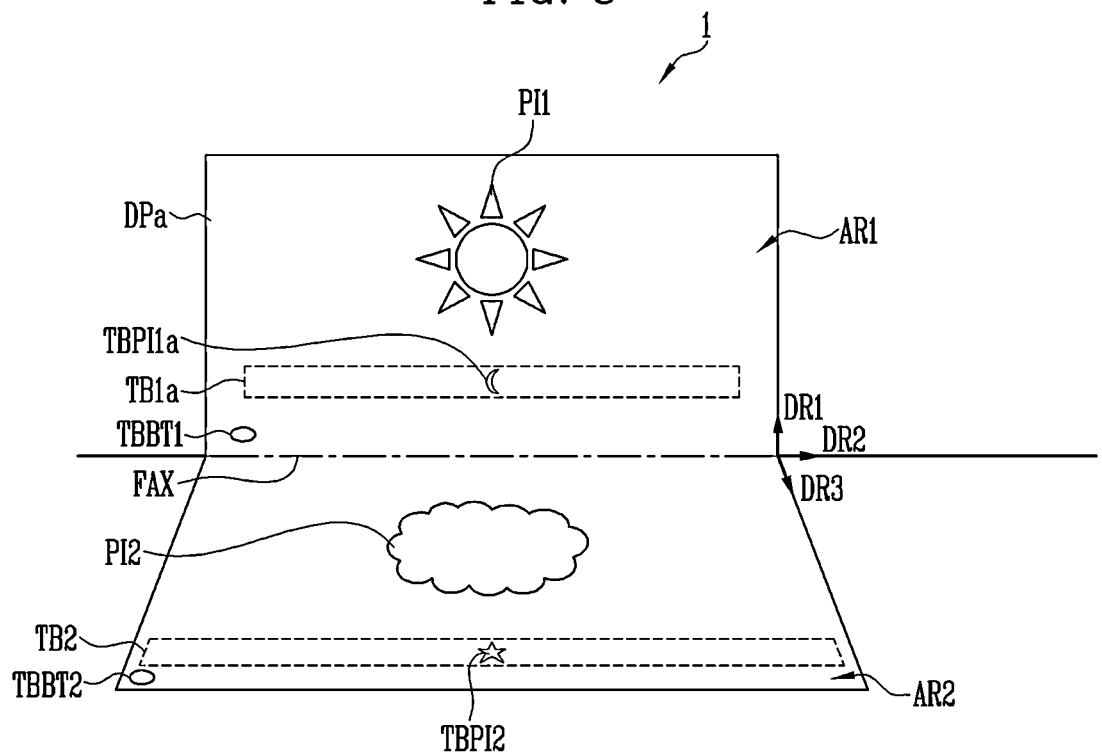
FIG. 8 is a diagram illustrating another example of the pixel area and the touch bar included in the display device of FIG. 1.

FIG. 8 is a diagram illustrating another example of the pixel area and the touch bar included in the display device of FIG. 1.

Hereinafter, descriptions of parts substantially overlapping with or identical to those of FIG. 4 are omitted.

The second partial image PI2, the second touch bar TB2, and a second touch button TBBT2 may be displayed in the second pixel area AR2. A second touch bar partial icon TBPI2 may be included in the second touch bar TB2 and may be included in the second pixel area AR2.

The second partial image PI2, the second touch bar TB2, and the second touch button TBBT2 included in the second pixel area AR2 may be displayed on the plane defined in the second direction DR2 and the third direction DR3. At this time, the second direction DR2 and the third direction DR3 may be orthogonal to each other.

The second touch bar TB2 may be displayed under the second partial image PI2 (the second display area). The second touch bar partial icon TBPI2 may be included in the second touch bar TB2.

The second touch bar partial icon TBPI2 is for controlling the second partial image PI2 and has various functions. For example, the second touch bar partial icon TBPI2 may execute or end the second partial image PI2. Although not shown in FIG. 8, the second touch bar TB2 may include a plurality of second touch bar partial icons TBPI2 that perform various functions.

The second touch button TBBT2 may be disposed (i.e., displayed) on one lower side surface of the second touch bar TB2. The second touch button TBBT2 may control the second touch bar TB2 and the second touch bar partial icon TBPI2.

According to an embodiment, when the second touch button TBBT2 is touched by the user, the mode selection window (not shown) for selecting a mode that is stored in advance may be displayed in the second pixel area AR2. In addition, different second touch bars TB2 stored in advance in response to the mode selected by the user may be displayed. In addition, the second touch bar TB2 may include the second touch bar partial icon TBPI2 for performing a function stored in advance.

The second touch bar TB2 including the second touch bar partial icon TBPI2 for performing different functions in response to the selected mode may be displayed in the second pixel area AR2.

In addition, according to another embodiment, when the second touch button TBBT2 is touched by the user, the display size area window (not shown) capable of setting a display size of the second touch bar TB2 may be displayed in the second pixel area AR2. In addition, the touch bar function selection window (not shown) for setting the second touch bar partial icon TBPI2 for performing different functions may be displayed.

The second touch bar TB2 including the second touch bar partial icon TBPI2 for performing different functions in response to the setting of the user may be displayed in the second pixel area AR2.

Referring to FIG. 8, the second touch bar TB2 is displayed under the second partial image PI2 (the second display area), but the second touch bar according to the invention is not limited thereto. For example, the second touch bar TB2 may be displayed on one side surface of the second partial image PI2 or may be displayed on the second partial image PI2 in another embodiment.

As described above, the same number of touch bars as the number of the plurality of pixel areas may be displayed in one area of each pixel area. Each touch bar may control each corresponding pixel area. For example, the first touch bar TB1*a* may control the first partial image PI1, and the second touch bar TB2*a* may control the second partial image PI2.

Figure 9:
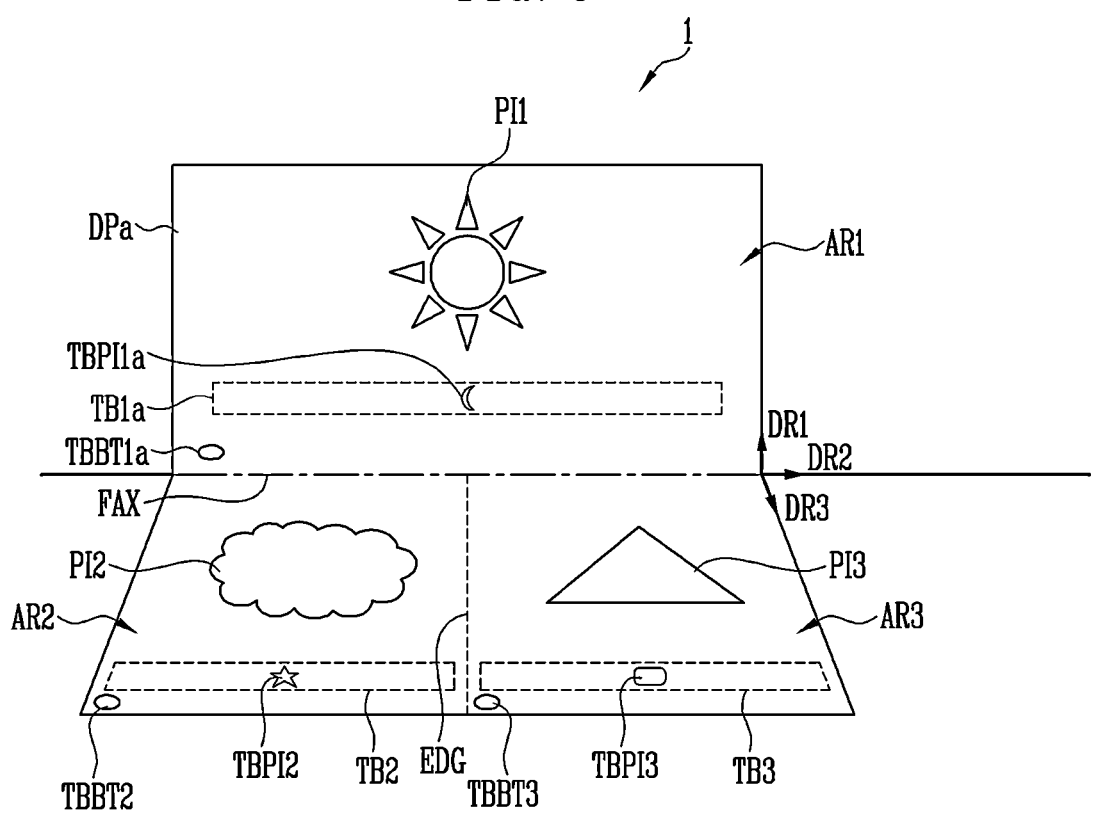
FIG. 9 is a diagram illustrating still another example of the pixel area and the touch bar included in the display device of FIG. 1.

FIG. 9 is a diagram illustrating still another example of the pixel area and the touch bar included in the display device of FIG. 1.

Referring to FIG. 9, the same number of first to third touch bars TB1*a*, TB2, and TB3 as the number of first to third pixel areas AR1, AR2, and AR3 are displayed. Hereinafter, descriptions of parts substantially overlapping with or identical to those of FIGS. 4 and 8 are omitted.

The second pixel area AR2 is disposed in a direction opposite to the second direction DR2 from the third pixel area AR3 with respect to a boundary EDG. The third pixel area AR3 is disposed in the second direction DR2 from the second pixel area AR2 with respect to the boundary EDG.

A third partial image PI3, the third touch bar TB3, and a third touch button TBBT3 may be displayed in the third pixel area AR3. A third touch bar partial icon TBPI3 may be included in the third touch bar TB3 and may be included in the third pixel area AR3.

The third partial image PI3, the third touch bar TB3, and the third touch button TBBT3 included in the third pixel area AR3 may be displayed on the plane defined in the second direction DR2 and the third direction DR3. At this time, the second direction DR2 and the third direction DR3 may be orthogonal to each other.

The third touch bar TB3 may be displayed under the third partial image PI3 (the third display area). The third touch bar partial icon TBPI3 may be included in the third touch bar TB3 and may be displayed under the third partial image PI3 (that is, in the third direction DR3).

The third touch bar partial icon TBPI3 is for controlling the third partial image PI3 and has various functions. For example, the third touch bar partial icon TBPI3 may execute or end the third partial image PI3. Although not shown in FIG. 9, the third touch bar TB3 may include a plurality of third touch bar partial icons TBPI3 for performing various functions.

The third touch button TBBT3 may be disposed (i.e., displayed) on one lower side surface of the third touch bar TB3. The third touch button TBBT3 may control the third touch bar TB3 and the third touch bar partial icon TBPI3.

According to an embodiment, when the third touch button TBBT3 is touched by the user, the mode selection window (not shown) for selecting the mode that is stored in advance may be displayed in the third pixel area AR3. In addition, different third touch bars TB3 stored in advance in response to the mode selected by the user may be displayed. In addition, the third touch bar TB3 may include the third touch bar partial icon TBPI3 for performing a function stored in advance.

The third touch bar TB3 including the third touch bar partial icon TBPI3 for performing different functions in response to the selected mode may be displayed in the third pixel area AR3.

According to another embodiment, when the third touch button TBBT3 is touched by the user, a display size area window (not shown) capable of setting a display size of the third touch bar TB3 may be displayed in the third pixel area AR3. In addition, a touch bar function selection window for setting the third touch bar partial icon TBPI3 for performing different functions may be displayed.

The third touch bar TB3 including the third touch bar partial icon TBPI3 for performing different functions in response to the setting of the user may be displayed in the third pixel area AR3.

Referring to FIG. 9, the third touch bar TB3 is displayed under the third partial image PI3 (the third display area), but the third touch bar according to the invention is not limited thereto. For example, the third touch bar TB3 may be displayed on one side surface of the third partial image PI3 or may be displayed on the third partial image PI3 in another embodiment.

As described above, the same number of touch bars as the number of the plurality of pixel areas may be displayed in one area of each pixel area. Each touch bar may control each corresponding pixel area. In addition, each touch bar may include a touch partial icon that performs various functions.

FIG. 10 is a flowchart illustrating a method of driving a display device according to an embodiment of the disclosure.

In step S10, the touch bar controller 112 receives information on the number of pixel areas in which the partial image is displayed.

In step S11, the touch bar controller 112 determines whether the number of pixel areas in which the partial image is displayed is plural.

In step S12, when the number of pixel areas is plural, the mode selector 113 determines whether the mode is set.

In step S13, when the mode is set, the touch bar controller 112 determines the display position, the display shape, and the display size of the touch bar corresponding to the set mode.

In step S14, when the mode is not set, the touch bar controller 112 determines the display position, the display shape, and the display size of the touch bar according to the selection of the user.

In step S15, the mode selector 113 determines whether the mode is set when there is one pixel area.

In step S16, when the mode is set, the touch bar controller 112 determines the display position, the display shape, the display size and the number of the at least one touch bar corresponding to the set mode.

In step S17, when the mode is not set, the touch bar controller 112 determines the display position, the display shape, the display size and the number of the at least one touch bar according to the selection of the user.

Although the embodiments have been described with reference to the accompanying drawings above, those of ordinary skill in the art to which the embodiment belongs may understand that the embodiment may be implemented in other specific forms without changing the technical spirit or essential features. Therefore, it should be understood that the embodiments described above are illustrative and not limiting in all respects.

What is claimed is:

1. A display device comprising:
    a display panel which displays an image in a plurality of pixel areas;
    a timing controller which supplies a first control signal for controlling a display position, a display shape, a display size and number of at least one touch bar; and
    a data driver which supplies a data signal to display the at least one touch bar at the display position in response to the first control signal,
    wherein the display panel is configured to display, in one of the plurality of pixel areas, at least one partial image, the at least one touch bar, at least one touch bar partial icon for controlling the image, and at least one touch button for controlling the at least one touch bar and the at least one touch bar partial icon,
    wherein the timing controller further comprises:
        a mode selector which selects the display position, the display shape, and the display size according to a mode; and
        a touch bar controller which supplies a second control signal for displaying a same number of touch bars of the at least one touch bar as a number of the pixel areas, in response to the mode,
    wherein when the mode is not set, the touch bar controller determines the display position, the display shape, and the display size of the touch bar according to a selection of a user,
    wherein when the at least one touch button is touched, a menu window for setting a display size of the at least one touch bar and a menu window for setting the at least one touch bar partial icon to perform different functions from each other are displayed in the one of the plurality of pixel areas.

2. The display device according to claim 1, wherein the display panel comprises:
    a first pixel area which displays a first partial image of the image, a first touch bar of the at least one touch bar, a first touch bar partial icon of the at least one touch bar partial icon in the first touch bar for controlling the first partial image, and a first touch button of the at least one touch button for controlling the first touch bar and the first touch bar partial icon; and
    a second pixel area which displays a second partial image of the image, a second touch bar of the at least one touch bar, a second touch bar partial icon of the at least one touch bar partial icon in the second touch bar for controlling the second partial image, and a second touch button of the at least one touch button for controlling the second touch bar and the second touch bar partial icon.

3. The display device according to claim 2, wherein the first touch bar is displayed in a first display shape and a first display size at a first display position, and
    the second touch bar is displayed in a second display shape and a second display size at a second display position.

4. The display device according to claim 2, wherein the display panel further includes a third pixel area which displays a third partial image and a third touch bar of the at least one touch bar, and
    the third touch bar is displayed in a third display shape and a third display size at a third display position.

5. The display device according to claim 1, wherein the display panel comprises:
    a first pixel area which displays a first partial image; and
    a second pixel area including an input interface, and
    wherein the at least one touch bar is displayed on one side surface of the input interface.

6. The display device according to claim 1, wherein the display panel comprises:
    a first pixel area which displays a first partial image and a first touch bar of the at least one touch bar; and
    a second pixel area including an input interface,
    wherein the first touch bar is displayed under the first partial image, and
    wherein a second touch bar of the at least one touch bar is displayed under the input interface.

7. The display device according to claim 1, wherein the display panel comprises:
    a first pixel area which displays a first partial image and a first touch bar of the at least one touch bar, the first touch bar being displayed under the first partial image; and
    a second pixel area which displays an input interface and a second touch bar of the at least one touch bar, the second touch bar having a display shape and a display size different from a display shape and a display size of the first touch bar and being displayed on one side surface of the input interface.

8. A method of driving a display device, the method comprising:
    displaying an image in a plurality of pixel areas;
    supplying a first control signal for controlling a display position, a display shape, a display size and number of at least one touch bar;
    supplying a data signal to display the at least one touch bar at the display position in response to the first control signal;
    displaying, in one of the plurality of pixel areas, at least one partial image, the at least one touch bar, at least one touch bar partial icon for controlling the image, and at least one touch button for controlling the at least one touch bar and the at least one touch bar partial icon; and
    in response to receiving a touch input of the at least one touch button, displaying a menu window for setting a display size of the at least one touch bar and a menu window for setting the at least one touch bar partial icon to perform different functions from each other in the one of the plurality of pixel areas, wherein supplying the first control signal comprises:
selecting the display position, the display shape, and the display size according to a mode; and
supplying a second control signal for displaying a same number of touch bars of the at least one touch bar as a umber of the pixel areas in response to the mode,
wherein when the mode is not set, the touch bar controller determines the display position, the display shape, and the display size of the touch bar according to a selection of a user.

9. The method according to claim 8, wherein displaying the image in the plurality of pixel areas comprises:
displaying a first partial image of the image, a first touch bar of the at least one touch bar, a first touch bar partial icon of the at least one touch bar partial icon in the first touch bar for controlling the first partial image, and a first touch button of the at least one touch button for controlling the first touch bar and the first touch bar partial icon in a first pixel area; and
displaying a second partial image of the image a second touch bar of the at least one touch bar, a second touch bar partial icon of the at least one touch bar partial icon in the second touch bar for controlling the second partial image, and a second touch button of the at least one touch button for controlling the second touch bar and the second touch bar partial icon in a second pixel area.

10. The method according to claim 9, wherein the first touch bar is displayed in a first display shape and a first display size at a first display position, and the second touch bar is displayed in a second display shape and a second display size at a second display position.

* * * * *